Aug. 8, 1939.  G. A. LYON  2,168,355
METHOD OF MAKING AUXILIARY IMPACT MEMBERS
Filed July 29, 1937
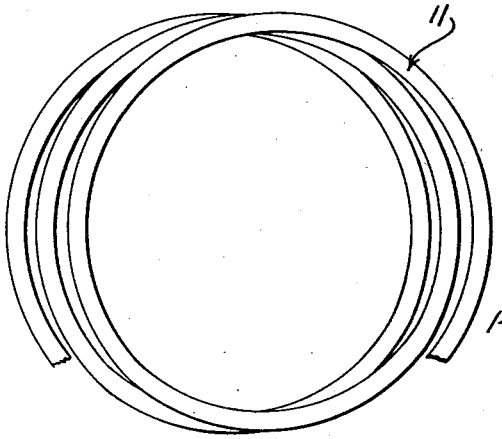
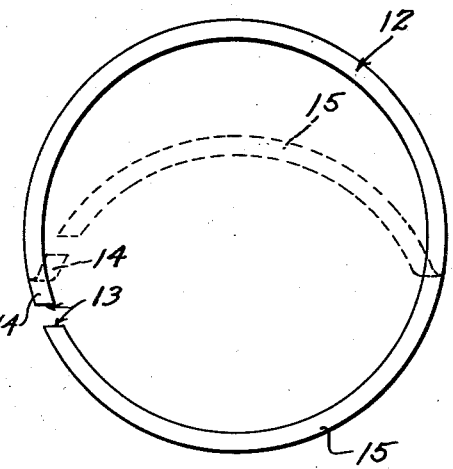
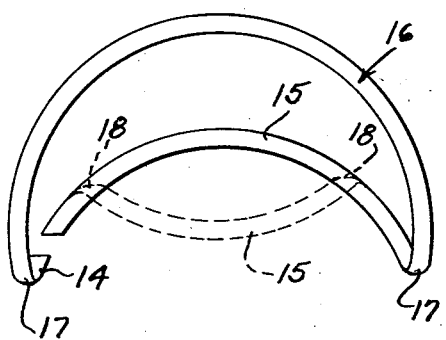
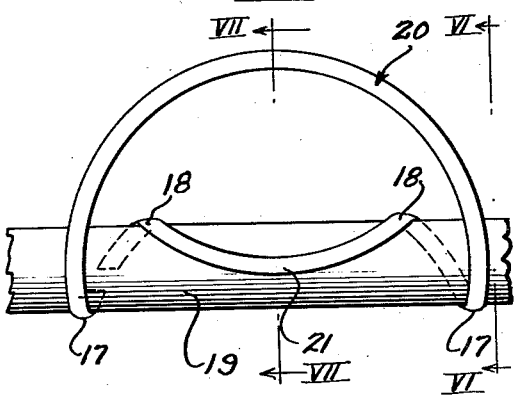
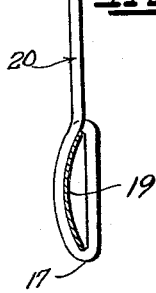
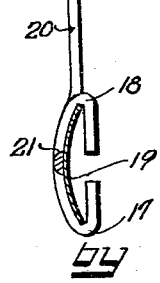
Inventor
GEORGE ALBERT LYON.

Patented Aug. 8, 1939

2,168,355

UNITED STATES PATENT OFFICE 2,168,355

METHOD OF MAKING AUXILIARY IMPACT MEMBERS

George Albert Lyon, Allenhurst, N. J.

Application July 29, 1937, Serial No. 156,282

8 Claims. (Cl. 29—152)

This invention relates to a method of making auxiliary impact members for vehicle bumpers, and more particularly to an auxiliary impact member which will increase the protection afforded by the bumper and which may be detachably secured to the bumper without drilling holes in the latter or otherwise altering or marring its construction.

Although the usual vehicle bumper or impact member, which is universally employed on automobiles of the present date, is satisfactory under most circumstances, it has been found that in many instances it is desirable to increase the protection which is afforded by the bumper or impact member by mounting thereon an auxiliary guard or impact member which extends centrally upwardly from the main bumper. This has been found to be particularly desirable where a cast grille radiator front is used on the vehicle. The increased protection which is afforded by the auxiliary impact member prevents overhanging objects or unusually high bumpers on other vehicles from riding over the top of the main bumper and breaking the relatively expensive cast grille radiator front. In view of the fact that the auxiliary impact member can only be secured at its lower end, it is highly important that it be constructed of material which is sufficiently strong to resist the usual impact to which a vehicle bumper is subjected and also to be secured to the vehicle bumper in such a manner that it cannot be ripped off. From a commercial standpoint, it is also desirable that the auxiliary impact member or guard be equipped with a mounting means which will permit the impact member or guard to be readily and quickly mounted on vehicle bumper and preferably without altering the form and construction of the bumper.

It is an object of this invention to provide a novel method of making an auxiliary impact member for vehicle bumpers having the above highly desirable characteristics.

Another object of this invention is to provide a novel method of making an auxiliary impact member for vehicle bumpers which is economical to manufacture and which is rugged and reliable in use.

A further object of this invention is to provide a novel method of making an auxiliary impact member which may be readily and quickly mounted on a vehicle bumper or the like.

The novel features which I believe to be characteristic of my invention are set forth with particularity in the appended claims. My invention itself, however, both as to its organization and method of operation, together with further objects and advantages thereof, may best be understood by reference to the following description, taken in connection with the accompanying drawing, in which:

Figure 1 illustrates a flat strip of spring steel stock from which the auxiliary impact member is to be made;

Figure 2 illustrates the spring steel strip of Figure 1 after it has been passed through suitable rollers and formed into a helix;

Figure 3 illustrates a circular section which has been cut from the helix of Figure 2;

Figure 4 shows the spring steel strip of Figure 3 after it has been folded along a line parallel to a diameter thereof;

Figure 5 illustrates the auxiliary impact member as a finished article mounted on a vehicle bumper;

Figure 6 is a cross-sectional view taken on the line VI—VI of Figure 5, looking in the direction of the arrows; and Figure 7 is a cross-sectional view taken on the line VII—VII of Figure 5, looking in the direction of the arrows.

Referring now to the various figures of the drawing which illustrate the application of the present invention to making a form of bumper guard shown in my copending application Serial No. 156,281, filed July 29, 1937, it will be observed that the various steps of the novel process of this invention are shown starting with the flat strip of spring steel stock in Figure 1 and progressing through the various figures in the finished article as shown in Figure 5. Although the form of the material which is employed to construct the auxiliary impact member of the present invention is immaterial to the carrying out of the teaching herein described, it has been found that a suitable grade of spring steel is the preferable form of material to use in constructing the auxiliary impact member. A flat strip of such stock is indicated by the reference numeral 10 in Figure 1. The steel strip 10 is first passed through a series of rollers or other suitable apparatus which forms a helix as is indicated at 11 in Figure 2. The diameter of the helix 11 is chosen to correspond with the desired width of the finished article.

The next step of the process is to sever the helix along some line parallel to its axis so as to form a plurality of circular strips of stock 12 which are severed at one point as is indicated at 13 in Figure 3. As is clearly shown in Figure 3, this line of severance of the circular strip 12 is preferably parallel to but not on a diameter of the strip.

With the circular strip 12 placed in the position as shown by the full lines in Figure 3 with the severed portion 13 slightly below the horizontal diameter of the strip, the free ends 14 and 15 are folded back on themselves along a line parallel to and slightly below the horizontal diameter of the strip 12. The resulting moon shape strip of stock which is shown by the full lines in Figure 4 has been given the reference numeral 16. As will be readily observed from a cursory inspection of Figure 4, the free end 15 extends substantially across the width of the article and for the most part is above the original horizontal diameter of the circular strip 12.

The next step of the process is to fold the central portion of the free end 15 back on itself as is indicated by the dotted lines in Figure 4. The vertical distance between the first fold 17 in the steel strip and the second fold 18 is substantially the same as the vertical width of the bumper 19 upon which the auxilary impact member is to be mounted. After the free end 15 has been folded as at 18—18, the auxiliary impact member is in its completed form and is indicated by the reference numeral 20 in Figure 5.

As will be observed upon an inspection of Figure 5, the downwardly bent central portion 21 of the free end 15 hooks over and extends partly down the front face of bumper 19, while the upturned short end 14 of the impact member 20 is adapted to hook under and extend up behind the bumper 19. It will thus be apparent that an extremely simple yet effective auxiliary impact member has been provided for vehicle bumpers that may be economically manufactured in a simple and novel manner and which is rugged and reliable in use.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The method of making auxiliary impact members for vehicle bumpers which includes taking a substantially circular ring of resilient metal stock, said ring having a discontinuity at one point thereon, folding the ring back on itself along a line substantially parallel to a diameter of the circular strip, one of the lines of fold being in close proximity to said discontinuity, thereby to provide a short folded end portion and a long folded end portion, and finally folding a central part of said long folded end portion forward on itself.

2. The method of making auxiliary impact members for vehicle bumpers which includes taking a substantially circular ring of resilient metal stock, said ring having a discontinuity at one point thereon, folding the ring back on itself along a line substantially parallel to a diameter of the circular strip, one of the lines of fold being in close proximity to said discontinuity, thereby to provide a short folded end portion and a long folded end portion, and finally folding a central part of said long folded end portion forward on itself along lines of fold substantially parallel to said first lines of fold.

3. The method of making auxiliary impact members for vehicle bumpers which includes taking a strip of spring steel stock and rolling it into a helix, severing the helix at a plurality of points to form a plurality of circular strips of stock severed at one point on the circle, folding a circular strip back on itself along a line substantially parallel to a diameter of the circular strip, one of the lines of fold being in close proximity to the severed point of the circular strip, thereby to provide a short folded end portion and a long folded end portion, and finally folding a central part of said long folded end portion forward on itself.

4. The method of making auxiliary impact members for vehicle bumpers which includes taking a strip of spring steel stock and rolling it into a helix, severing the helix at a plurality of points to form a plurality of circular strips of stock severed at one point on the circle, folding a circular strip back on itself along a line substantially parallel to a diameter of the circular strip, one of the lines of fold being in close proximity to the severed point of the circular strip, thereby to provide a short folded end portion and a long folded end portion, and finally folding a central part of said long folded end portion forward on itself along lines of fold substantially parallel to said first lines of fold.

5. The method of making auxiliary impact members for vehicle bumpers which includes taking a substantially circular strip of resilient metal stock, folding one end of said strip back on itself to form a short upwardly turned end portion, folding the other end back on itself to form a relatively long arcuate shape end portion which extends substantially across but slightly less than the width of the circle originally formed by said strip, and folding a portion of said long end portion forward on itself.

6. The method of making auxiliary impact members for vehicle bumpers which includes taking a substantially circular strip of resilient metal stock, folding one end of said strip back on itself to form a short upwardly turned end portion, folding the other end back on itself to form a relatively long arcuate shape end portion which extends substantially across but slightly less than the width of the circle originally formed by said strip, and folding a portion of said long end portion forward on itself but spaced from the strip so as to overlie a part of the front face of a bumper and support the impact member thereon.

7. The method of making auxiliary impact members for vehicle bumpers which includes taking a substantially circular strip of resilient metal stock, folding one end of said strip back on itself to form a short upwardly turned end portion spaced from the strip and into the form of a hook adapted to hook under said bumper, folding the other end back on itself to form a relatively long arcuate shaped end portion which extends substantially across but slightly less than the width of the circle originally formed by said strip, folding a portion of said long end portion forward on itself.

8. The method of making auxiliary impact members for vehicle bumpers which includes taking a substantially circular strip of resilient metal stock, folding one end of said strip back on itself to form a short upwardly turned end portion spaced from the strip and into the form of a hook adapted to hook under said bumper, folding the other end back on itself to form a relatively long arcuate shaped end portion which extends substantially across but slightly less than the width of the circle originally formed by said strip and spaced from the strip, and folding a portion of said long end portion forward on itself to extend upwardly behind a bumper upon which the impact member is to be mounted, as well as forming its end into a hook shape to extend over the top of the bumper.

GEORGE ALBERT LYON.